UNITED STATES PATENT OFFICE.

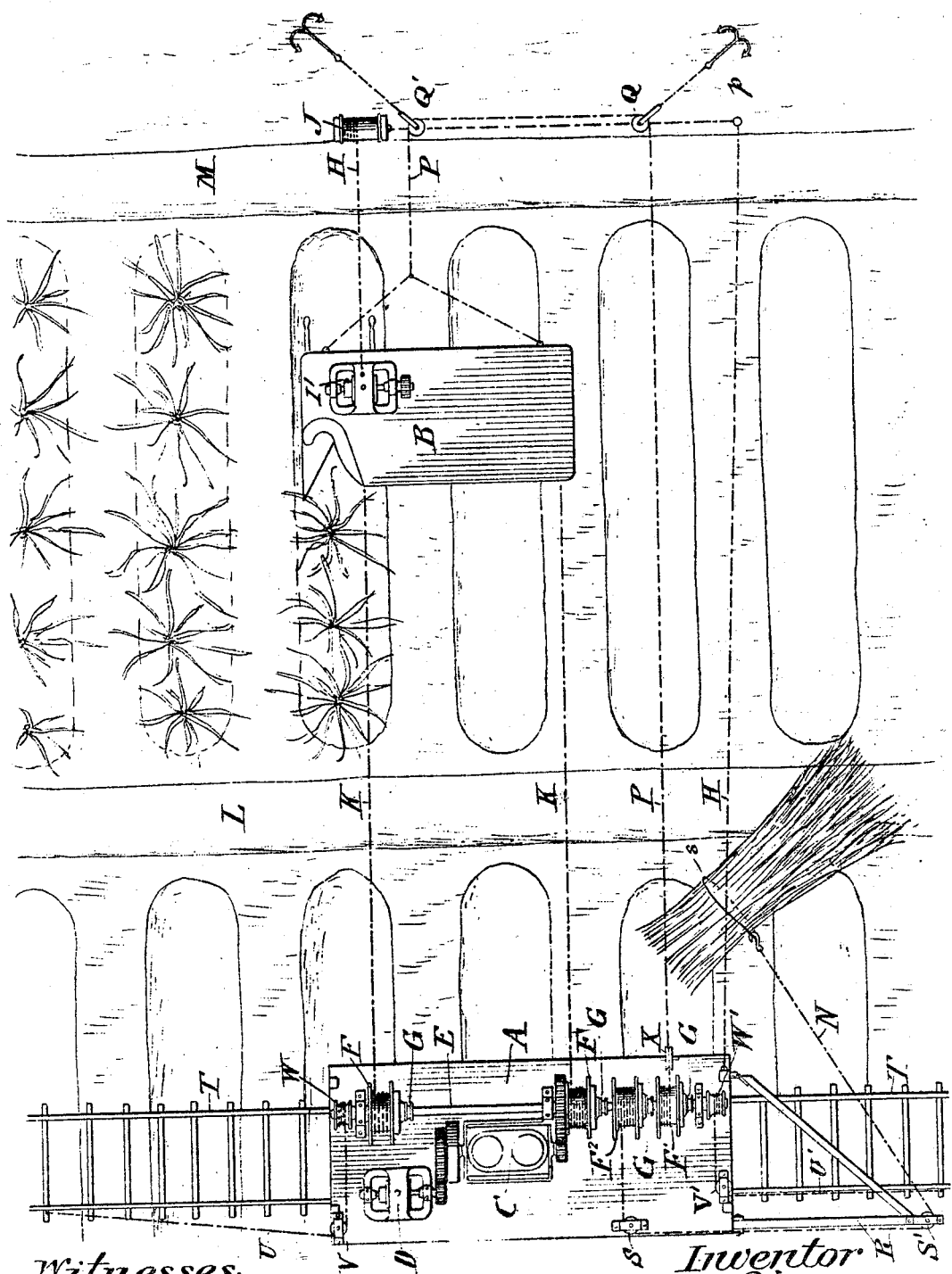

HENRY GABRIEL GINACA, OF HONOLULU, TERRITORY OF HAWAII, ASSIGNOR OF ONE-HALF TO GEORGE P. THIELEN, OF HONOLULU, TERRITORY OF HAWAII.

SYSTEM OF HARVESTING SUGAR-CANE.

No. 798,033.      Specification of Letters Patent.      Patented Aug. 22, 1905.

Application filed December 15, 1904. Serial No. 237,010.

*To all whom it may concern:*

Be it known that I, HENRY GABRIEL GINACA, a citizen of the United States, residing at Honolulu, Island of Oahu, Territory of Hawaii, have invented certain new and useful Improvements in Systems of Harvesting Sugar-Cane, of which the following is a specification.

My invention relates to an improved method or system of harvesting sugar-cane, and has for its object a practical system whereby most of the work of harvesting can be done by power instead of by hand-labor and in a rapid, efficient, and economical manner.

In most irrigated cane-fields, particularly in Hawaii, the irrigation-ditches are about thirty feet apart and the cane is grown in the intervening space in rows five to six feet apart and at right angles to said ditches, either in the furrows or between the furrows through which water from said ditches is admitted for irrigating the cane. The stalks average one and one-half inches in diameter, eight to ten feet long, and weigh from forty to eighty tons to the acre. Its growth is often so luxuriant, the stalks becoming so intertwined and forming such a network, that, owing to repeated failures, it has heretofore been thought to be impossible to harvest such cane by any system other than by hand. The cutting of the stalks by means of cane-knives in the hands of laborers is necessarily slow and laborious. The cane is not only cut, but topped and stripped by hand and loaded onto cars run over portable tracks laid through the fields. A system which can successfully replace this hand-labor, or at least a large portion of it, by machines operated by power is of great value to sugar-cane plantations, particularly in Hawaii, where labor is high-priced and uncertain.

With these objects in view my invention consists in the arrangement and combination of parts and apparatus, as hereinafter fully described and claimed, reference being had to the accompanying drawing, representing in plan a portion of a cane-field and the apparatus I employ in my system of harvesting sugar-cane. The principal apparatus I employ may be divided into two parts—first, a portable power plant, and, second, a novel machine for cutting and conveying sugar-cane. As this latter machine forms the subject-matter of a separate application for Letters Patent, a detailed description of same is omitted herein, and it is only referred to in its relation to the present invention.

The portable power plant A may be mounted upon a suitable wagon or, preferably, upon a car adapted to run over the plantation-tracks and may be provided with a frame-work supporting a roof and sides of canvas or other suitable material to protect the apparatus from the weather. This portable power plant A consists of a gasolene or other engine C, an electric generator D, driven thereby, a drum-shaft E, also driven by said engine, and friction or other clutches G, by means of which any one of the cable-drums F may at the will of the operator be connected to the drum-shaft E for operating the cables. The cable-drums may be so arranged on the drum-shaft that the cables may operate on either side of the track, or the platform of the portable power plant may be turn-tabled on its car-truck, so that the drum-shaft side may be turned to face the field on that side of the portable track to be harvested. One or more hauling-in cables K, operated by the drums F, are attached to the front of the cutting and conveying machine B. The hauling-out or backing cable P, operated by the drum F', is passed through the sheaves Q and Q' and attached to the rear of the machine B. These sheaves are provided with means for anchoring them quickly in the field. The unloading-cable N, operated by the drum $F^2$, passes over a sheave S, attached to the rear end of the platform of the car, and through a block S', attached to the outer end of the detachable brace R, projecting rearward from the platform. The backing-cable P may pass over a sheave X above the drum F' and supported by the framework of the roof, so as not to interfere with the working of the unloading-cable N. Current for the motor I', operating the cutting device of the machine B, is supplied by the generator D of the power plant through a suitable electrically-insulated flexible cable H. A portable drum J, placed in the field in the rear of the machine B, pays out or takes up the slack of the cable H, as the case may be, depending upon whether the movement of the machine B is toward or from the power plant A, or the drum J may be located either on the portable power plant or on the cutting-machine to pay out or take up the slack of the cable H, as the case may be, depending upon whether the movement of the machine B is from or toward the power plant A. The cable H is supported by the framework of the roof of the power plant. When the drum J is used in the rear of the machine B, a light pole $p$ may be stuck in the field to support the cable H. If electric power is obtainable throughout the field to be harvested, then the engine C and the generator D could be omitted and a small motor substituted to revolve the drum-shaft E.

In operating my system the machine B is hauled by one or more cables K, winding on the drums F, under the control of the operator of the power plant A, toward the irrigation-ditch L, the machine B as it advances cutting the cane grown in one row and depositing same upon the apron of the machine, upon which it is conveyed. Upon arrival at the ditch L the machine B is stopped, and the cable N is run out and detached to a sling $s$, previously placed upon said apron, whereby the cut cane on the machine B is unloaded therefrom and is pulled rearward of the power plant A and alongside of the portable track T, where it may be topped, stripped, and loaded onto cars to be taken to the mill, the topping, stripping, and loading being accomplished either by hand or by machines suitable for the purpose. In the meantime the machine B has been hauled back to the ditch M by means of the cable P passing over the sheaves Q and Q', anchored, as shown, this cable being operated by the drum F'. The machine B and the drum J are then carried sidewise to begin on the next row, and the power plant is also moved forward along the track T a corresponding amount. In pulling back the machine B the cables K are by the same operation drawn out. These operations, as above described, are repeated for successive rows. The cables are made long enough so that these same operations may then be repeated for harvesting the cane in that portion of the field between the ditch M and the ditch next beyond it and then again between this latter ditch and the ditch next beyond it, these ditches being approximately thirty, sixty, and ninety feet, respectively, from the ditch L, which is thought to be the economical limit for operating before shifting the power plant to another portable track. Cables U U', led out and attached to the track T, the other end passing over sheaves V V', attached to the platform and then around gypsy-heads W W' on the ends of the drum-shaft E, provide one means for advancing the power plant A.

While the drawing shows the apparatus right-handed, it is obvious that it could be made left-handed, if so desired. The engine C could drive an air-compressor instead of the generator D; but a great objection to the use of compressed air is the inconvenience of the hose necessary to connect the motor of the cutting device of the machine B with the air-compressor of the power plant A.

Having thus described my invention, what I claim is—

1. An apparatus for harvesting sugar-cane comprising a portable machine for cutting cane, a portable power plant for hauling the cutting-machine toward or from the power plant in either desired direction and for supplying the power for operating the cutting device, and means for transmitting the power so supplied to the cutting device.

2. An apparatus for harvesting sugar-cane, comprising a portable machine for cutting and conveying cane, a portable power plant, for hauling the cutting and conveying machine toward or from the power plant in either desired direction, and for operating the cutting device, and means for transmitting the power.

3. An apparatus for harvesting sugar-cane, comprising a portable machine for cutting and conveying cane, a portable power plant for hauling the cutting and conveying machine toward or from the power plant in either direction, and means for unloading the machine.

4. In an apparatus for harvesting sugar-cane, the combination of a motor-driven cutting device, a power plant adapted for use on a portable track, comprising a gasolene-engine, an electric generator, a shaft provided with cable-drums and clutches whereby any cable may be operated at will, cables for hauling the cutting-machine toward or from the power plant in either direction, an electrically-insulated cable for supplying current from the generator of the power plant to the motor of the cutting device, and means for taking up the slack in said cable.

In testimony whereof I have signed my name to this specification in the presence of two subscribing witnesses.

HENRY GABRIEL GINACA.

Witnesses:
  ROBT. J. PRATT,
  A. F. EWART.